(12) United States Patent  (10) Patent No.: US 8,874,245 B2
Reinsch et al.  (45) Date of Patent:  Oct. 28, 2014

(54) EFFECTS TRANSITIONS IN A MUSIC AND AUDIO PLAYBACK SYSTEM

(75) Inventors: Mario Reinsch, Bremen (DE); Paul Kellett, Bremen (DE); Wolfram J. Knelangen, Bremen (DE)

(73) Assignee: Inmusic Brands, Inc., Cumberland, RI (US)

( * ) Notice: Subject to any disclaimer, the term of this patent is extended or adjusted under 35 U.S.C. 154(b) by 725 days.

(21) Appl. No.: 12/952,541

(22) Filed: Nov. 23, 2010

(65) Prior Publication Data

US 2012/0130516 A1    May 24, 2012

(51) Int. Cl.
*G06F 17/00* (2006.01)
*G11B 27/00* (2006.01)
*G10H 1/00* (2006.01)
*G10H 1/46* (2006.01)

(52) U.S. Cl.
CPC ............... *G06F 17/00* (2013.01); *G11B 27/00* (2013.01); *G10H 1/0091* (2013.01); *G10H 1/46* (2013.01)
USPC ............................................. 700/94

(58) Field of Classification Search
USPC ............... 700/94; 381/61, 98–109; 369/4
See application file for complete search history.

(56) References Cited

U.S. PATENT DOCUMENTS

| | | | |
|---|---|---|---|
| 2002/0029088 A1* | 3/2002 | Yamada et al. | 700/94 |
| 2002/0159375 A1* | 10/2002 | Eguchi et al. | 369/91 |
| 2003/0039373 A1* | 2/2003 | Lawson et al. | 381/119 |
| 2008/0314232 A1* | 12/2008 | Hansson et al. | 84/625 |
| 2009/0248183 A1* | 10/2009 | Miwa | 700/94 |
| 2012/0109348 A1* | 5/2012 | Matsunaga et al. | 700/94 |

FOREIGN PATENT DOCUMENTS

WO    WO 0111809 A1 *  2/2001

* cited by examiner

*Primary Examiner* — Andrew C Flanders
(74) *Attorney, Agent, or Firm* — Finnegan, Henderson, Farabow, Garrett & Dunner LLP (57) ABSTRACT

A music and audio playback system enables an operator to control an audio effect for transitioning an audio output signal from a first audio source to a second audio source by using a single cross-fader control. The transition audio effect combines the two incoming sources using a function that depends on the current position of the cross-fader control. Effects include cross-fading the frequency range, band-ducking, vocoder effects, and beat-cutting effects. The technique is especially advantageous in DJ performance systems in which audio effect-based transitions can add excitement and variety to a performance. Dedicated transition effect preset buttons located near the cross fader facilitate rapid selection by the DJ of the cross-fader controlled transition audio effect.

20 Claims, 4 Drawing Sheets

EFFECTS TRANSITIONS IN A MUSIC AND AUDIO PLAYBACK SYSTEM

BACKGROUND

One type of musical performance involves playing back recorded music and sounds in a new "mix." The performer is commonly called a disc jockey, or DJ.

A DJ relies on many tools to create a musical performance. For example, vinyl records may be manipulated on multiple turntables, or multiple compact discs (CDs) may be manipulated to create a variety of sound effects. The disc jockey may vary the speed, pitch, direction, and sequence of playback, and may apply a variety of effects to the played back music.

More recently, DJs have been using tools that manipulate audio data stored in data files on computers. Some of these tools have been developed with the idea of computerizing what is usually done with turntables, vinyl records, and CD players. The flexibility of the computer enables new tools and techniques to be explored for use in performances. One such computer-based system is described in U.S. Patent Publication No. 2008/0013757, which is wholly incorporated herein by reference. Commercially available computer-based DJ playback systems, such as the Torq® system available from Avid Technology, Inc., of Burlington, Mass., incorporate expanded functionality enabled by replacing vinyl record turntables and CD players with simulated turntables that control digital audio files.

However, DJs continually seek new tools to help make their performances richer and more compelling. Additional tools need to be easy to use, with a highly responsive interface, since the DJ's hands are already very busy controlling the audio sources and volumes.

SUMMARY

In a music and audio playback system, the control of an audio effect is assigned to a cross-fader control, enabling a DJ to transition between two audio sources using audio effect-based transitions using a single control.

In general, under one aspect, a music and audio playback system comprises: a first input for receiving audio data from a first audio source; a second input for receiving audio data from a second audio source; a processor for processing audio data; an audio output for outputting audio data; and a user-operable cross-fader control; wherein the processor is configured to apply in real time a user-selected audio effect for combining audio data received from the first audio source via the first input and audio data received from the second audio source via the second audio input to generate a processed audio signal, wherein a parameter of the audio effect is controlled by a current state of the cross-fader control, and wherein the music and audio playback system outputs the processed audio signal via the audio output.

Various embodiments include one or more of the following features. The music and audio playback system includes one or more input controls for enabling the user to select the audio effect. The current state of the cross-fader control corresponds to one of a range of positions, the range of positions having a left limit and a right limit, and the processed audio signal comprises the audio data received from the first audio source when the cross-fader is in the left limit position and the audio data received from the second audio source when the cross-fader is in the right limit position. The processed audio signal in a first frequency range comprises the audio data lying within the first frequency range received from the first audio source, and for a second frequency range that comprises frequencies not included in the first frequency range, the processed audio signal includes the audio data lying within the second frequency range received from the second audio source. The first frequency range ranges from a lowest frequency present in either of the audio sources to a frequency f, wherein f is a function of the current state of the cross-fader. The processed audio signal corresponds to a frequency cross-fade between the first audio source and the second audio source, wherein the current state of the cross-fader controls one or more frequency cut-offs between frequencies derived from the first audio source and frequencies derived from the second audio source. The music and audio playback system includes a user-operable direction switch, and switching the direction switch from a first state to a second state causes the first audio input and the second audio input to be interchanged before applying the user-selected audio effect. The music and audio playback system comprises a disc jockey performance system, or may be part of disc jockey performance system.

In general, under another aspect, a music and audio playback system comprises: a first input for receiving audio data from a first audio source; a second input for receiving audio data from a second audio source; a processor for processing audio data; an audio output for outputting audio data; and a user-operable cross-fader control; wherein the processor is configured to apply in real time a user-selected audio effect for combining audio data received from the first audio source via the first input and audio data received from the second audio source via the second audio input to generate a processed audio signal, and wherein the music and audio playback system outputs a signal comprised of a combination the processed audio signal at a first level, the audio data from the first audio source at a second level, and the audio data from the second audio source at a third level, wherein the first, second, and third levels are controlled by a state of the cross-fader control.

Various embodiments include one or more of the following features. The system includes a user-operable direction switch, and switching the direction switch from a first state to a second state causes the first audio input and the second audio input to be switched before applying the user-selected audio effect. The user-selected audio effect includes modulating a volume of the first audio source with a function of a volume of the second audio source. The modulating function is a decreasing or an increasing function the volume of the first audio source. The user-selected audio effect comprises a vocoder effect. The user-selected audio effect comprises generating a toggle signal comprised of toggling back and forth between the first audio source and the second audio source, wherein a speed of toggling back and forth between the first audio source and the second audio source is based on a tempo of at least one of the first and second audio sources. Prior to applying the real time audio effect, the audio data received from the first audio source via the first input and the audio data received from the second audio source via the second audio input is transformed into frequency space, and the real-time audio effect is applied in frequency space to the transformed audio data to produce a processed signal, and the processed signal is transformed back to a time-domain representation prior to being output at the first level.

In general, under a further aspect, a method of generating a processed audio signal includes: receiving at an audio and music playback system including a processor and a user-operable cross-fader control, audio data from a first audio source; receiving at the audio and music playback system audio data from a second audio source; and, using the processor, combining the received audio data from the first audio source and the audio data from the second audio source by applying in real time a user-selected audio effect, wherein a parameter of the audio effect is controlled by a current state of the cross-fader control, and wherein the music and audio playback system outputs the processed audio signal.

In various embodiments the audio and music playback system includes or is a part of a disc jockey performance system.

In general under a yet further aspect, a method of generating a processed audio signal includes: receiving at an audio and music playback system including a processor and a user-operable cross-fader control, audio data from a first audio source; receiving at the audio and music playback system audio data from a second audio source; and, using the processor, combining the received audio data from the first audio source and the audio data from the second audio source by applying in real time a user-selected audio effect, and wherein the music and audio playback system outputs a signal comprised of a combination the processed audio signal at a first level, the audio data from the first audio source at a second level, and the audio data from the second audio source at a third level, wherein the first, second, and third levels are controlled by a state of the cross-fader control. In various embodiments the method is performed by a disc jockey using a disc jockey performance system.

DETAILED DESCRIPTION

DJs operate in a highly exacting environment. The control of the audio sources requires split-second timing and control using a separate hand for each audio source. Furthermore, volumes and other settings need to be set with rapid finger movements without interrupting the control of the audio sources. In order to be of value to a DJ, effects should not require the use of more than one hand, or even one finger.

In existing DJ systems, the cross-fader controls a fade from a first source that is currently playing to a second source by turning up the volume of the second source while simultaneously turning down the volume of the first. In the system described herein, the transition between the two audio sources is not performed by fading between the volumes of the outgoing source and the incoming source, but by the application of audio effects to the audio sources. This feature offers the DJ the ability to vary the performance with audio effect-based transitions by using just a single easy-to-use control.

Figure 1:
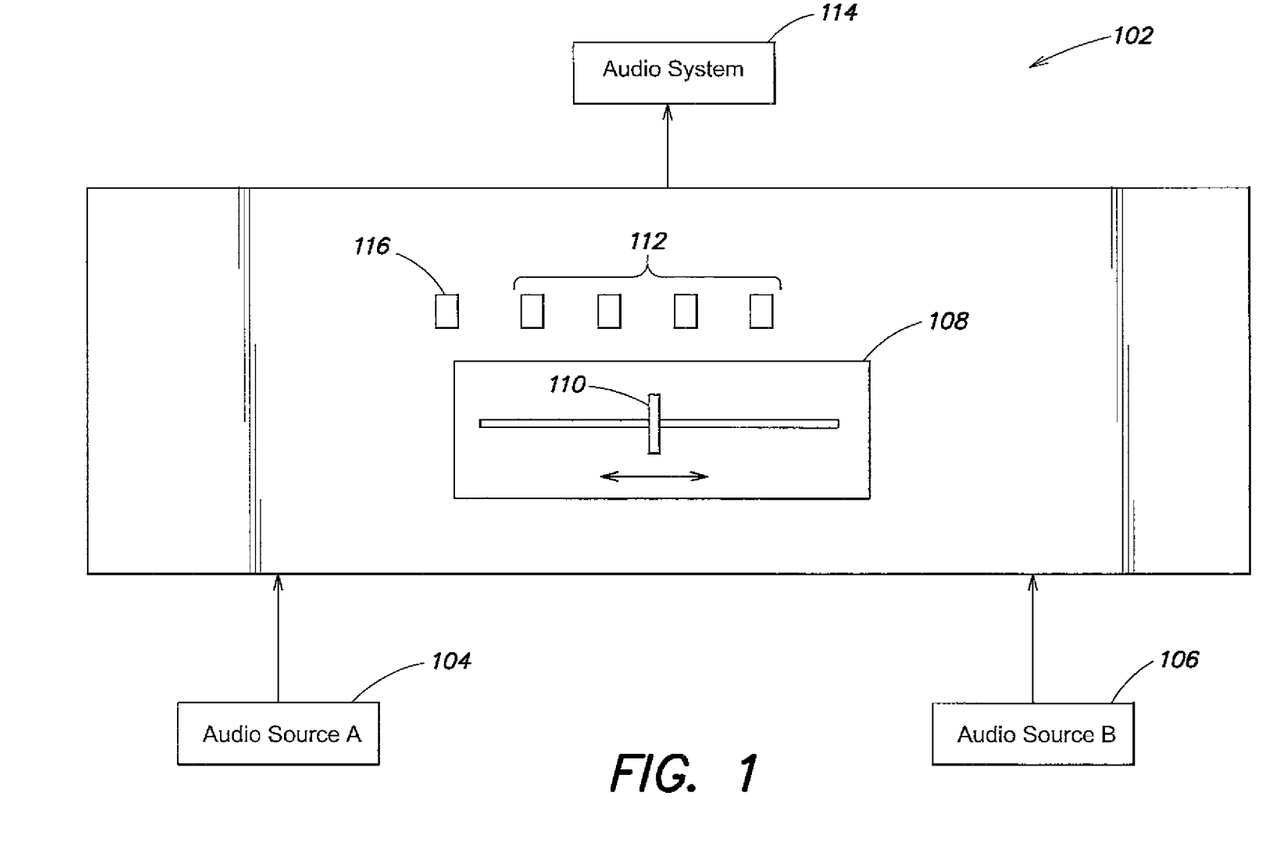
FIG. 1 is a simplified diagram of selected components of the user interface of a music and audio playback system.

An interface for implementing an effects-based transition control is shown in FIG. 1, DJ playback system 102 includes inputs to receive signals from audio source A (104) and audio source B (106), which may be generated from digital audio files, or may be generated by playback of media, such as CD or vinyl. The DJ system also includes cross-fader 108, which in its normal function enables the DJ to perform the conventional volume-based transition between audio source A and B. In this mode, when slider 110 is at the far left position, audio source A is played at full volume and audio source B is at zero volume; when the slider is at the mid-point, each source is attenuated by an equal amount; and when the slider is at the far right position, source A is at zero volume, and source B is at full volume. In order to activate effects-based transitions, the DJ presses one of the effects preset buttons 112. Each of these buttons assigns a particular predetermined effect to the cross-fader for controlling transitions between the two audio sources. In various embodiments, the effect to be assigned to the cross-fader is selected from a menu of available effects. It is convenient for the DJ to preselect the desired effects, so that they can be selected rapidly with a single press of a button during a live performance. The playback system also includes an audio output to connect the DJ playback system to audio system 114, such as a headphone for monitoring by the DJ, or a sound amplification system for live performance.

Figure 2A:
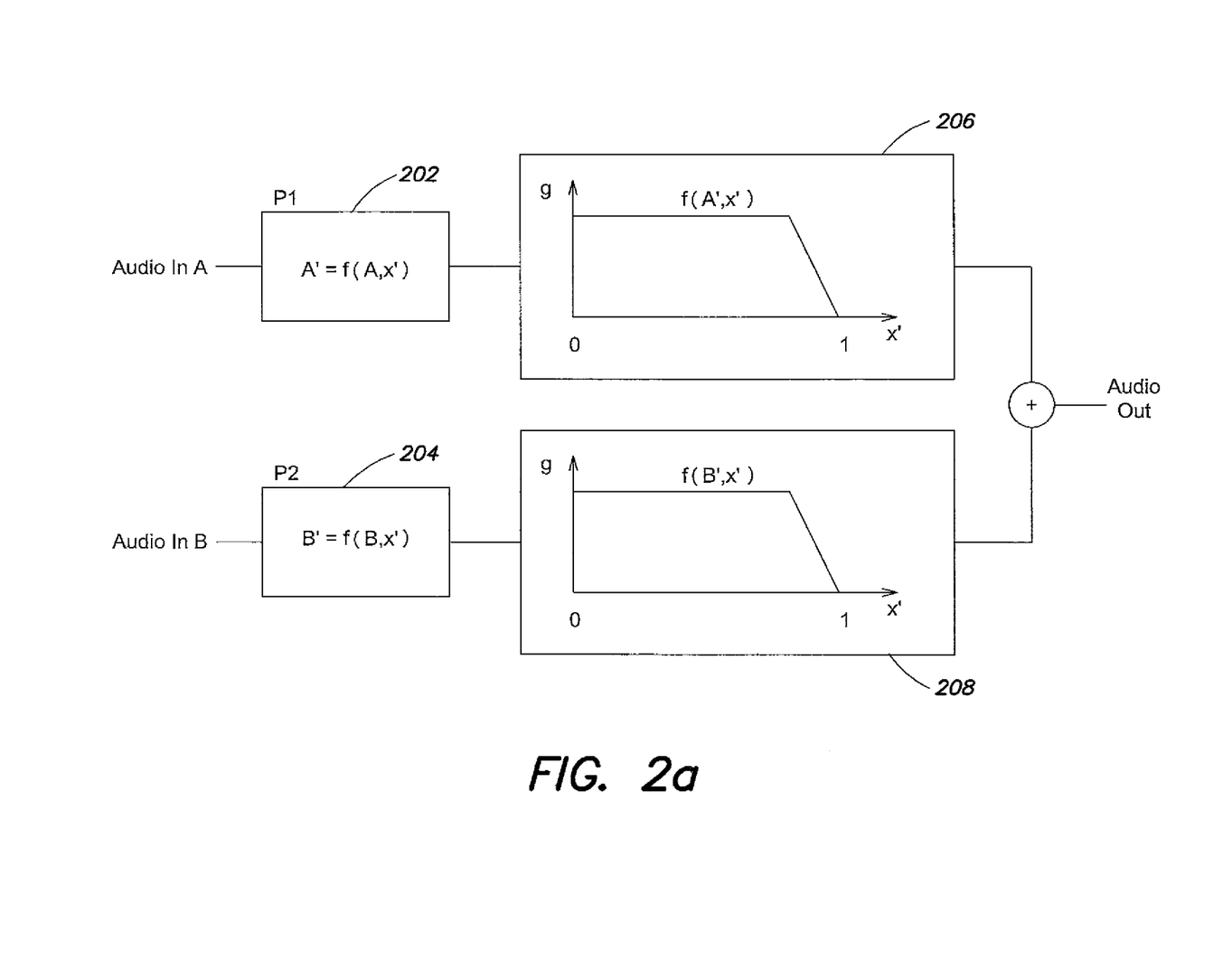
FIG. 2a illustrates a process for creating a first type of effects transition.
Figure 2B:
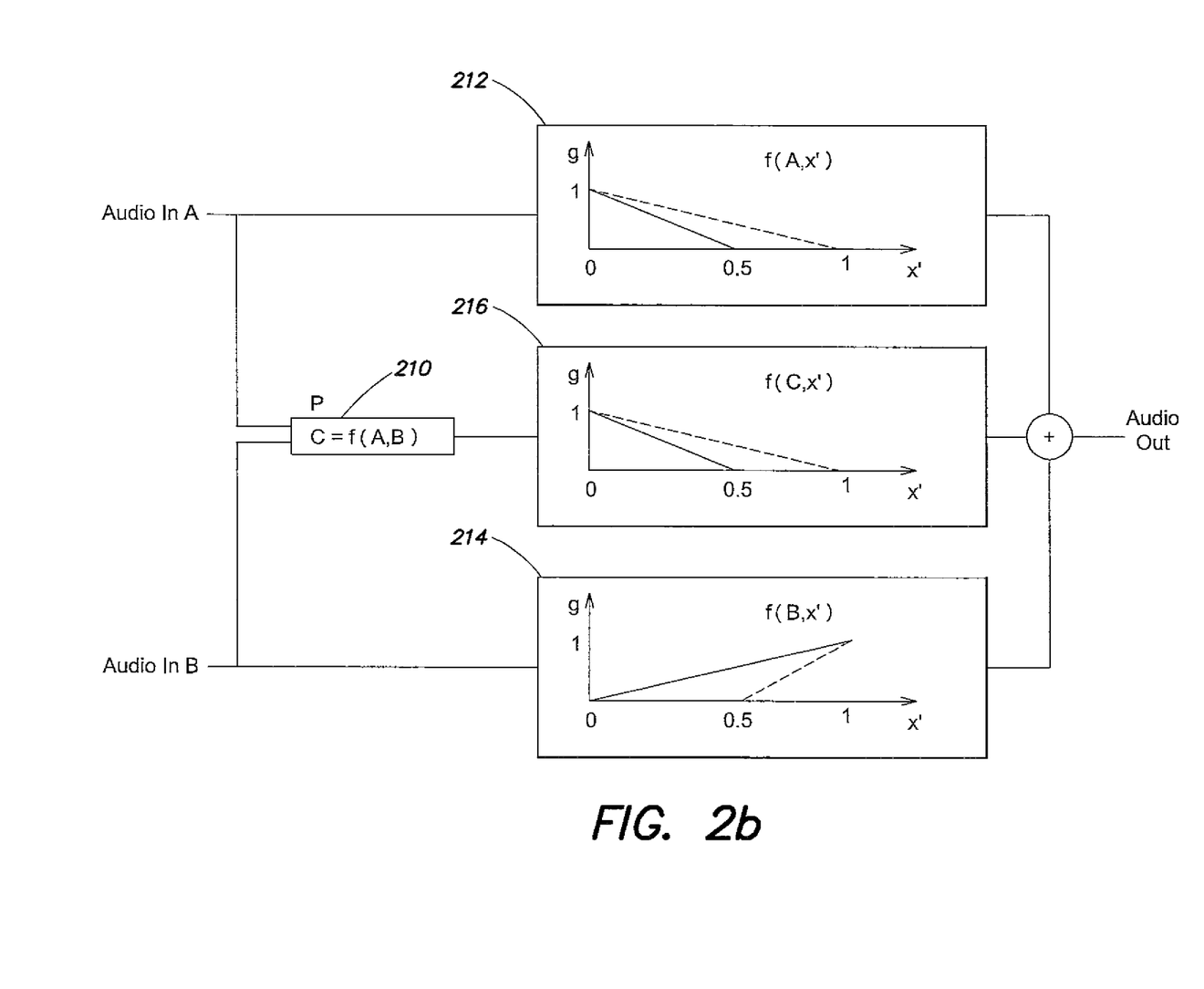
FIG. 2b illustrates a process for creating a second type of effects transition.
Figure 2C:
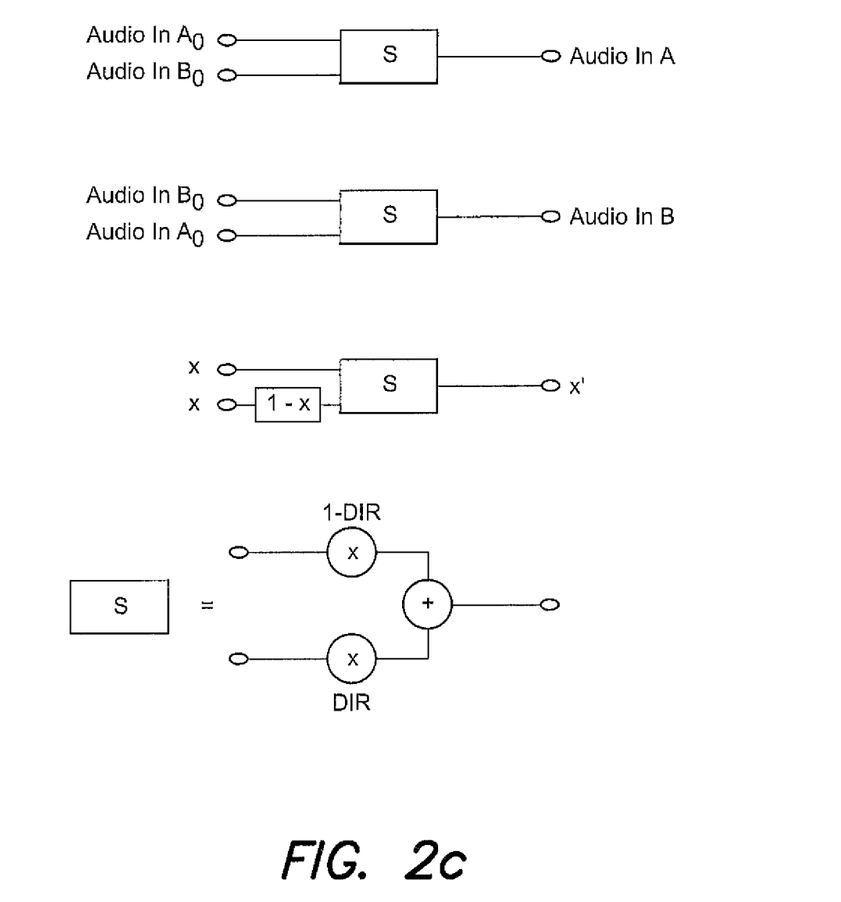
FIG. 2c shows how certain variables used in the effects transitions are defined.

The basic methods of generating effects transitions are illustrated in FIGS. 2a-c. In transitions of Type I, a first process P1 202 is applied to the first audio source A and a second process P2 204 is applied to the second audio source B, as shown in FIG. 2a. Each of the processes outputs a signal that is a function of both the incoming source signal and the cross-fader state x', where x' is defined in FIG. 2c. The outputs of the first process and of the second process are input to gain controls 206 and 208 respectively, each of which is controlled by the cross-fader state x'. The outputs of each of the processes are then combined to produce the system's output signal. In transitions of Type II, illustrated in FIG. 2b, audio sources A and B are combined according to a process P 210 that is independent of the cross-fader state. In addition, each of the audio sources are input directly into separate gain controls 212, 214, and the output of process P is input to third gain control 216, with each of the gain controls applying a gain as a function of the cross-fader state x'. In the gain controls illustrated in FIG. 2b, the solid lines and the dotted lines indicate alternative gain curves; the choice of curve may depend on the particular transition effect being applied, and may be pre-selected by the designer after evaluating the two alternatives.

In each of the transition effects described herein, the effect is processed in one of two ways that depends on the user setting of a two-state physical or software-based switch 116, named DIR, which determines which role is assigned to each of the audio sources in implementing the audio transition effects. When DIR is set to 0, audio source A is input to the Audio in A input jack and audio source B is input to the Audio in B input jack, and x'=x, where x is the absolute cross-fader position, defined over a normalized range of 0 (left end of the range) to 1 (right end), and DIR is the direction switch, having a value of 0 or 1. When DIR is set to 1, the audio sources are swapped at the input jacks, and the cross-fader state is inverted: x'=1−x. FIG. 2c illustrates this logic, with the input signals represented as follows: Audio in $A_0$ is the left cross-fader input stereo audio signal; Audio in $B_0$ is the right input stereo audio signal.

We now illustrate the application of effect-based transitions with a set of examples.

Example 1

Cross-Fading the Frequency Range

In this transition, when transitioning from source A to source B, the frequency range between a low frequency and a high frequency range cut-off for audio source A is decreased from the entire frequency range to zero, while for audio source B the frequency range is increased from zero to the entire frequency range. As the transition is first introduced, the listener first hears source B in the bass range from 0 Hz to a cut-off frequency and source A from the cut-off to the top end of the frequency range. As the transition continues, the cut-off frequency is increased, and the listener gradually hears source B frequencies extending higher to the mid-range, and up, with source A being heard only at mid-high frequencies, until the signal from source B is played over the entire frequency range, and source A is not heard at all. This cross-fading effect corresponds to Type I (see FIG. 2a), in which P1 (202) is a high pass filter having a lower cut-off frequency that moves from 0 (though in practice, the lower limit is generally in the range 0.1-10 Hz) to 20 kHz, and P2 (204) is a low pass filter having an upper cut-off frequency that moves from 0 Hz to 20 kHz as the cross-fader is moved from one end of its range to the other.

In a variant of low pass/high pass filter cross-fading, the cross-fader is used to control two cut-off frequencies that move in opposite directions. As the cross-fader is moved from one end of the range, a frequency range in the mid-levels (e.g., centered around 1 kHz) gradually expands at both a high frequency cut-off and a low frequency cutoff. The output signal consists of the first audio source for all frequencies outside the expanding mid-range, and of the second audio source for frequencies within the expanding mid-range. Referring to FIG. 2a again, in this variant, P1 is a mid-cut filter with two cut-off frequencies in which the cut-off frequencies move from 1 kHz to 0 Hz and 1 kHz to 20 kHz respectively as the cross-fader is moved from one end of its range to the other.

Example 2

Ducker

With the ducker effect, the volume of one of the sources is used to modulate the volume of the other source. The modulation reduces the volume of the first source by an amount that is a function of (e.g., proportional to) the second source. Sliding the cross-fader causes the modulated combination to become more and more pronounced as the first signal is faded out until the cross-fader mid-point is reached. Moving past the mid-point, the second source is faded in over the modulated first source, which is faded out. Thus, when transitioning from source A to source B, the A signal is increasingly faded out as the modulation of A by the volume of B is faded in, and the modulated signal reaches a maximum at the mid-point. Moving past the mid-point, the modulated signal is faded out as the unprocessed signal B is faded in. This effect behaves in a similar fashion to a modulated side-chain compressor. The ducker transition effect corresponds to a Type II transition (FIG. 2b) in which P (210) corresponds to reducing the level of audio source A by an amount that is a function of the instantaneous volume of audio source B. Gain controls 212, 214, and 216 are set to combine the output of P with the unprocessed signals as illustrated in the Figure.

A variant of the ducker effect is a band ducker, in which the various band levels of one audio source modulate the corresponding band levels of the other audio source. Referring again to FIG. 2b, P is generated as follows. Audio inputs A and B are split into approximately 12 frequency bands. The RMS level of each of the source B bands is measured, and a function of this measured value is used to reduce the corresponding band of source A. In the described embodiment, the function is an inverse function, reducing the level of the corresponding A band by an amount proportional to the measured B band level. Thus a high level in a given band of B results in a large reduction of that band level in A. The resulting bands of A are added together to produce the audio output. As for the ducker, the effect of the cross-fader is to vary the strength of this modulation effect, with the modulated signal at a maximum at when the cross-fader is at the mid-point, and fading out in favor of the unprocessed signals A and B respectively as the first and second ends of the range are approached.

Example 3

Vocoder

The vocoder acts in an opposite fashion to the ducker. In the ducker, the levels of the bands in the first signal are reduced to "create space" for the incoming second signal, whereas the vocoder algorithm attempts to match the signal band levels of both signals. This effect corresponds to a Type II transition (FIG. 2b), in which process P is defined as follows. Audio sources A and B are split into approximately 12 frequency bands. The RMS levels of each band of A and B are measured, and a gain is applied to each band of B to make the result match the level of the corresponding band of A. In practice, there is a gain limit that depends on the frequency of a band, since boosting a band by more than a certain factor, e.g., a factor of 2, can introduce undesirable noise. In the last step, all the bands of B are added together to produce the output of the process P. The cross-fader-controlled transition effect is then applied by mixing the signals A, B, and C as shown in FIG. 2b.

In a vocoder transition that produces a gentler effect, band-splitting filters with less steep edges are used to split the sources. Further softening of the effect may be achieved by limiting the gain range with an upper limit not higher than about one.

Example 4

Beat Cutter

The DJ playback system is able to determine the tempo of the music playing in each of the audio sources. Note, the tempo of each of the input audio sources is usually the same following tempo adjustment, either automatically or manually. In the described embodiment, the system determines the tempo by performing the following steps: (i) cut the audio file into short time slices, e.g., 5 ms slices; (ii) pass each of the time slices through low-pass, mid-pass, and high-pass filters; (iii) measure the levels of the slices in the outputs of the low, mid, and high-pass filters; and (iv) search for transients, i.e., levels that increase suddenly in one or more of the bands from one slice to the next. Once transients are detected, the tempo can be determined as follows: (v) identify characteristics and weightings of transients associated with the various kinds of beats, such as downbeats and normal beats; (vi) based on the identified beat characteristics, estimate the tempo at various different points in the audio file; (vii) analyze all the tempo estimates to identify the tempo that corresponds to the largest number of estimates and/or the tempo for which the clearest signatures were found; and (viii) using the best tempo estimate from step (vii), tag all the slices with their beat position.

Using derived tempo information, the system generates a signal by toggling back and forth between the two audio sources in rhythmic synchrony with the beat of the music. This transition effect is of Type II (FIG. 2b), in which process P implements the rhythmic toggling of the sound between A to B. The toggle effect may dwell for an equal length of time with each signal, e.g., a ⅛ note or 1/16 note duration, or dwell for different periods on each signal, e.g., a 1/16 on the A signal and 3/16 on the B signal. These durations are adapted for different rhythms, and when triplet notes are used. As for all the Type II transitions, the output of the toggle process is then cross-faded as shown in the FIG. 2b by mixing the outputs of signals from gain control A, B, and C. Thus the effect of the cross-fader is as follows:

Fader at far left position: audio source A: full; toggle signal: off; audio source B: off.

Fader at middle position: audio source A: off; toggle signal: full; audio source B: off.

Fader at far right position: audio source A: off; toggle signal: off; audio source B: full.

Example 5

Envelope

In the envelope effect, the envelope of audio signal B is applied to audio signal A, similar to a one-band vocoder effect.

Example 6

Ring Mod

The ring mod transition effect is of Type II in which process P involves multiplying signals A and B together. Levels are then compensated for to ensure that the result lies within an audible volume range. For example, when both A and B are at a low level, the product level may well be low enough to require compensation, so that it remains audible and at an appropriate level. This effect produces a noisy, metallic sound, with a clearly artificial character.

Example 7

Switch Beat

In this Type I transition effect, P1 is a normal fade except that the algorithm causes low frequencies in signal A, e.g., less than about 200 Hz, to switch more abruptly to the corresponding low frequencies from signal B. P2 has the same, but reverse function. In other words, two different cross-fader curves are used for each frequency range. The incoming signals are cut into two bands, one of which is processed with a normal gain curve, i.e., conventional cross-fade, and the other which is processed by the "switchy" curve, transitioning rapidly from off to full on when the cross-fader is in the middle position.

Example 8

Loudest

In this Type II transition effect, P outputs the loudest of signals A and B at any time. Level balancing of A and B may be necessary to obtain optimal results with this effect. In a variant, the cross-fader is used to weight the comparison between A and B before the loudness comparison is made. In another variant, a lower limit is set on the time between switching between the two signals.

Example 9

Pump

In this Type II transition effect, signal B is faded up from silence as the end of each beat approaches. The beat may correspond to a quarter note.

Example 10

Limit

In this Type I transition effect, P1 and P2 are limiters instead of gains. Sliding the cross-fader has the effect of raising the limiter threshold on B while lowering it on A.

Example 11

Halo

In this transition effect, each incoming signal is split into two parts, the first comprising the "mid" parts that are substantially the same in the stereo left and right channels, and the second "sides" parts comprising the rest. For many musical styles, the mids are principally composed of the bass and drums, and the sides of effects sounds, reverbs, and delays. One method of splitting the left (L) and right (R) channels into the mid and sides parts is to use the formula: MID=(L+R)/2 and SIDES=(L−R)/2. In this Type I transition, fade-out is first applied to the mids of signal A, and B is faded in for sides. Continuing along the cross-fader range, the A sides are then faded out and the B mids are faded in. Referring to the FIGS. 2a, P1 and P2 are applied differentially to the mids and sides. This method of band separation is known as MS processing, especially in the context of vinyl, in which the M (mid) signals are cut vertically into the vinyl, while the S (sides) are cut in horizontally.

Example 12

Slow Mo

Signal A is cut into time slices corresponding to the beats; the slices are progressively lowered in pitch as signal B is faded in. In this Type I transition effect, P1 corresponds to a slicing and pitch-shifting function, and P2 is a straightforward gain.

In addition to the processes described above, additional Type II audio effect transitions may be obtained by transforming the input audio signals into the frequency domain using an FFT algorithm, and performing the process P in frequency space, The output of the transformation process is then resynthesized into the time domain, and passed to the gain controls, as described above in connection with the Type II transitions.

One example of a frequency space based transition effect is tonal fading. The incoming audio signals are split into two parts, the first part containing components of the signal that a listener can identify as having a pitch, and the second part containing the rest, such as transients and noise. In one version, a different fading curve is applied to each of the parts. For example, the tonal part may be faded out first, leaving "tonal space" for the incoming source, whose tonal part is faded in first. The non-tonal components are faded in next. In a more sophisticated version, specific tonal information from the first source, such as the root key, chords, and the scale, are applied to the corresponding tonal part of the second source, in a tonal morph effect.

The processing of the described audio transition effects may be implemented in hardware, and supplied together with a DJ playback system product. Alternatively, various effects may be added to the playback system, such as via a plug-in architecture. Such additional effects, or indeed all the effects, may be executed as software running on a general purpose processor or on a DSP within the DJ playback system.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism, and may include one or more digital signal processors (DSPs) to assist with audio signal processing. The input device and output device also are connected to the processor and memory system via the interconnection mechanism.

One or more output devices may be connected to the computer system. Example output devices include, but are not limited to, liquid crystal displays (LCD), plasma displays, cathode ray tubes, video projection systems and other video output devices, printers, devices for communicating over a low or high bandwidth network, including network interface devices, cable modems, and storage devices such as disc or tape. One or more input devices may be connected to the computer system. Example input devices include, but are not limited to, a keyboard, keypad, track ball, mouse, pen and tablet, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disc to be processed by the application program. The invention is not limited to a particular memory system. Time-based media may be stored on and input from magnetic or optical discs, which may include an array of local or network attached discs.

A system such as described herein may be implemented in software or hardware or firmware, or a combination of the three. The various elements of the system, either individually or in combination may be implemented as one or more computer program products in which computer program instructions are stored on a computer readable medium for execution by a computer, or transferred to a computer system via a connected local area or wide are network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A music and audio playback system comprising:
    a first input for receiving audio data from a first audio source;
    a second input for receiving audio data from a second audio source;
    a processor for processing audio data;
    an audio output for outputting audio data; and
    a user-operable cross-fader control;
    wherein the processor is configured to apply in real time a user-selected audio effect for combining audio data received from the first audio source via the first audio input and audio data received from the second audio source via the second audio input to generate a processed audio signal,
    wherein the processed audio signal in a first frequency range comprises the audio data received from the first audio source that lies within the first frequency range, and the processed audio signal in a second frequency range comprises the audio data received from the second audio source that lies within the second frequency range, corresponding to the frequencies not included in the first frequency range, a current state of the cross fader control controlling one or more frequency cut-offs between frequencies derived from the first audio source and frequencies derived from the second audio source,
    wherein a parameter of the audio effect is controlled by a current state of the cross-fader control, and
    wherein the music and audio playback system outputs a signal comprising the processed audio signal, the audio data from the first audio source, and the audio data from the second audio source via the audio output.

2. The music and audio playback system of claim 1, wherein the music and audio playback system includes one or more input controls for enabling the user to select the audio effect.

3. The music and audio playback system of claim 1, wherein the current state of the cross-fader control corresponds to one of a range of positions, the range of positions having a left limit and a right limit, and wherein:
    the processed audio signal comprises the audio data received from the first audio source when the cross-fader is in the left limit position; and
    the processed audio signal comprises the audio data received from the second audio source when the cross-fader is in the right limit position.

4. The music and audio playback system of claim 1, wherein the first frequency range ranges from a lowest frequency present in either of the audio sources to a frequency f, wherein f is a function of the current state of the cross-fader.

5. The music and audio playback system of claim 1 further comprising a user-operable direction switch, and wherein switching the direction switch from a first state to a second state causes the first audio input and the second audio input to be interchanged before applying the user-selected audio effect.

6. The music and audio playback system of claim 1, wherein the music and audio playback system comprises a disc jockey performance system.

7. A music and audio playback system comprising:
a first input for receiving audio data from a first audio source;
a second input for receiving audio data from a second audio source;
a processor for processing audio data;
an audio output for outputting audio data; and
a user-operable cross-fader control;
wherein the processor is configured to apply in real time a user-selected audio effect for combining audio data received from the first audio source via the first audio input and audio data received from the second audio source via the second audio input to generate a processed audio signal,
wherein the processed audio signal in a first frequency range comprises the audio data received from the first audio source that lies within the first frequency range, and the processed audio signal in a second frequency range comprises the audio data received from the second audio source that lies within the second frequency range, corresponding to the frequencies not included in the first frequency range, a current state of the cross fader control controlling one or more frequency cut-offs between frequencies derived from the first audio source and frequencies derived from the second audio source,
wherein the music and audio playback system outputs a signal comprising the processed audio signal at a first level, the audio data from the first audio source at a second level, and the audio data from the second audio source at a third level, and
wherein the first, second, and third levels are controlled by the state of the cross-fader control.

8. The music and audio playback system of claim 7 further comprising a user-operable direction switch, and wherein switching the direction switch from a first state to a second state causes the first audio input and the second audio input to be switched before applying the user-selected audio effect.

9. The music and audio playback system of claim 7, wherein the user-selected audio effect includes modulating a volume of the first audio source with a function of a volume of the second audio source.

10. The music and audio playback system of claim 9, wherein the modulating function is a decreasing function of the volume of the first audio source.

11. The music and audio playback system of claim 9, wherein the modulating function is an increasing function of the volume of the first audio source.

12. The music and audio playback system of claim 7, wherein the user-selected audio effect comprises a vocoder effect.

13. The music and audio playback system of claim 7, wherein the user-selected audio effect comprises generating a toggle signal comprised of toggling back and forth between the first audio source and the second audio source is based on a tempo of at least one of the first audio source and the second audio source.

14. The music and audio playback system of claim 7, wherein prior to applying the real time audio effect, the audio data received from the first audio source via the first input and the audio data received from the second audio source via the second audio input is transformed into frequency space, and the real-time audio effect is applied in frequency space to the transformed audio data to produce a processed signal, and wherein the processed signal is transformed back to a time-domain representation prior to being output at the first level.

15. A method of generating a processed audio signal, the method comprising:
receiving at an audio and music playback system including a processor and a user-operable cross-fader control, audio data from a first audio source;
receiving at the audio and music playback system audio data from a second audio source; and
using the processor, outputting a processed audio signal comprising the received audio data from the first audio source and the audio data from the second audio source by applying in real time a user-selected audio effect,
wherein the processed audio signal in a first frequency range comprises the audio data received from the first audio source that lies within the first frequency range, and the processed audio signal in a second frequency range comprises the audio data received from the second audio source that lies within the second frequency range, corresponding to the frequencies not included in the first frequency range, a current state of the cross fader control controlling one or more frequency cut-offs between frequencies derived from the first audio source and frequencies derived from the second audio source,
wherein a parameter of the audio effect is controlled by the current state of the cross-fader control, and
wherein the music and audio playback system outputs a signal comprising, the audio data from the first audio source, the audio data from the second audio source, and the processed audio signal.

16. The method of claim 15, wherein the audio and music playback system comprises a disc jockey performance system.

17. A method of generating a processed audio signal, the method comprising:
receiving at an audio and music playback system including a processor and a user-operable cross-fader control, audio data from a first audio source;
receiving at the audio and music playback system audio data from a second audio source; and
using the processor, outputting a processed audio signal comprising the received audio data from the first audio source and the audio data from the second audio source by applying in real time, a user-selected audio effect,
wherein the processed audio signal in a first frequency range comprises the audio data received from the first audio source that lies within the first frequency range, and the processed audio signal in a second frequency range comprises the audio data received from the second audio source that lies within the second frequency range, corresponding to the frequencies not included in the first frequency range, a current state of the cross fader control controlling one or more frequency cut-offs between frequencies derived from the first audio source and frequencies derived from the second audio source, and
wherein the music and audio playback system outputs a signal comprising the processed audio signal at a first level, the audio data from the first audio source at a second level, and the audio data from the second audio source at a third level, wherein the first, second, and third levels are controlled by the state of the cross-fader control.

18. The method of claim 17, wherein the music and audio playback system is associated with a disc jockey performance system.

19. The music and audio playback system of claim 1, wherein the processed audio signal corresponds to a ducker effect.

20. The music and audio playback system of claim 1, wherein the processed audio signal corresponds to a vocoder effect.

* * * * *